(12) United States Patent
Troia et al.

(10) Patent No.: US 10,553,058 B2
(45) Date of Patent: Feb. 4, 2020

(54) SECURE WIRELESS LOCK-ACTUATION EXCHANGE

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/023,309

(22) Filed: Jun. 29, 2018

(65) Prior Publication Data

US 2020/0005570 A1      Jan. 2, 2020

(51) Int. Cl.
  *G07C 9/00*    (2006.01)
  *B60R 25/20*   (2013.01)
  *H04L 29/06*   (2006.01)

(52) U.S. Cl.
  CPC ...... *G07C 9/00309* (2013.01); *B60R 25/2072* (2013.01); *H04L 63/1466* (2013.01); *G07C 2009/00492* (2013.01); *G07C 2009/00555* (2013.01)

(58) Field of Classification Search
  CPC ...... G07C 9/00309; G07C 2009/00492; G07C 2009/00555; H04L 63/1466; B60R 25/2072
  See application file for complete search history.

(56) References Cited

U.S. PATENT DOCUMENTS

| | | | | |
|---|---|---|---|---|
| 5,081,586 A | * | 1/1992 | Barthel | B60R 16/0315 |
| | | | | 701/49 |
| 5,363,448 A | * | 11/1994 | Koopman, Jr. | G06F 7/584 |
| | | | | 340/5.26 |
| 2007/0200671 A1 | | 8/2007 | Kelley et al. | |
| 2014/0165675 A1 | | 6/2014 | Morita | |
| 2014/0223198 A1 | | 8/2014 | Saranghar et al. | |
| 2019/0028445 A1 | * | 1/2019 | McLaughlin | H04W 12/001 |

FOREIGN PATENT DOCUMENTS

| | | |
|---|---|---|
| JP | 2016012918 | 1/2016 |
| KR | 101258613 | 4/2013 |

OTHER PUBLICATIONS

"International Application Serial No. PCT US2019 039200, International Search Report dated Oct. 25, 2019", 3 pgs.
"International Application Serial No. PCT US2019 039200, Written Opinion dated Oct. 25, 2019", 6 pgs.

* cited by examiner

*Primary Examiner* — Nader Bolourchi
(74) *Attorney, Agent, or Firm* — Schwegman Lundberg & Woessner, P.A.

(57) ABSTRACT

System and techniques for a secure wireless lock-actuation exchange are described herein. After receiving a request to actuate a lock from a device, a controller can calculate a challenge counter and then perform verification iterations until an end condition is met—which is a failure of a verification iterations or the number of iterations reaches the challenge count. If the verification iterations reach the challenge count (e.g., there are no failed iterations), then the controller actuates the lock. Each iteration includes an exchange between the device and the controller that the device validates by signing a message with a private key shared by the device and the controller. The exchange also includes a freshness value integrated into the device validation to prevent replay attacks.

21 Claims, 5 Drawing Sheets

SECURE WIRELESS LOCK-ACTUATION EXCHANGE

TECHNICAL FIELD

Embodiments described herein generally relate to remote actuation of a motor or other device and more specifically to a secure wireless lock-actuation exchange.

BACKGROUND

Wireless mechanisms to actuate a motor, solenoid, or other device have been employed in a variety of products, such as garage door openers or vehicle locking mechanisms (e.g., unlocking a car door, opening a trunk, starting the engine, etc.). A pairing between a signaler (e.g., a wireless key-fob) and the actuator (e.g., a vehicle unlocking mechanism) can be used to add security to the process. Such pairing typically does not employ sophisticated encryption to reduce component costs and increase battery life in the signaler, for example.

Rolling codes (e.g., hopping codes) can be used to prevent replay attacks possible with simple pairing. A replay attack involves recording a previous transmission—such as using a radio receiver in proximity to the signaler being successfully used—and replaying the transmission in the future to achieve an unauthorized actuation. Rolling codes help to prevent this attack by defining a sequence of codes, a next code in the sequence used for a next actuation attempt. The signaler and the actuator store the sequence and maintain an index into the sequence that is incremented with each use. Thus, recording a previously used code in the sequence will not be accepted by an actuator because the actuator has moved on to another code in the sequence after the recorded code was successfully used.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Rolling codes are susceptible to an attack, sometimes called Rolljam, in which an attacker actively intervenes in an actuator exchange. The attacker snoops the frequency to obtain a first code from the signaler. The attacker also jams the wireless link (e.g., by broadcasting on the frequency to raise the noise floor above the signaler's signal). Thus, the actuator receiver does not operate (e.g., open a lock) and does not move the rolling code sequence forward. If the signaler attempts the actuation again—such as a user again pressing the "unlock" button on a key-fob because the vehicle door did not unlock—the attacker captures the second code, jams the receiver again, and then transmits the first code. Because the actuator did not progress the sequence when the first code was originally sent from the signaler, the actuator will accept the first code and operate, progressing the sequence to the second code. Because the attacker has the second code, the attacker can broadcast it at a later time, resulting in an effective operation of the actuator.

To address the security problem presented by the Rolljam attack, as well as related techniques, a secure wireless lock-actuation exchange is described herein. The exchange modifies a typical wireless actuation technique by introducing a variable number of challenge-response exchanges into each request. Each of these exchanges involves the signaler and the actuator to prove a secret that enables the other of the exchange to verify that a given exchange is authorized. The technique is effective because an attacker cannot predict whether a given captured signal form the signaler with operate the actuator, and thus cannot effectively capture a signal that will operate the actuator in the future. Further, because the technique can be implemented with hardware that already exists on signalers and actuators, the low-cost components, and high-energy efficiency typically required by these systems is maintained.

Additional details and examples are provided below. Although many examples relate to vehicle actuation systems, other examples with similar operating parameters can equally benefit from the described devices and techniques. Example system can include garage door openers, wireless locks for buildings, and other wirelessly activated actuators.

Figure 1:
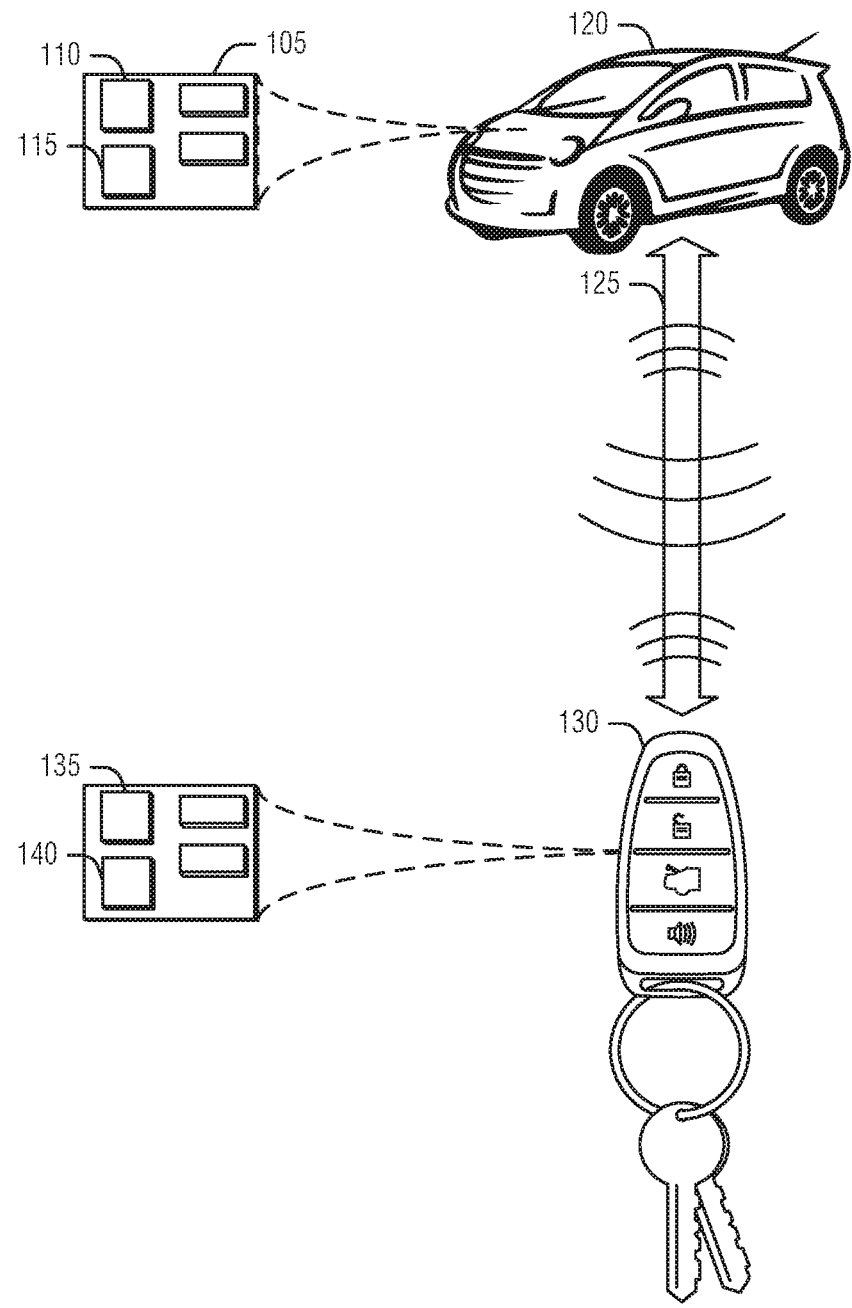
FIG. 1 is a block diagram of an example of an environment including a system for secure wireless lock-actuation exchange, according to an embodiment.

FIG. 1 is a block diagram of an example of an environment including a system for secure wireless lock-actuation exchange, according to an embodiment. The environment includes a device 130 (e.g., signaler) and a vehicle 120 with a controller 105 (e.g., actuator controller) operably coupled to control a lock n actuator (for example, such as a motor or solenoid) to operate (lock/unlock) a vehicle lock. Although the examples involve a vehicle 120, other systems, such as garage door opener, can be used with the devices and techniques described herein.

The device 130 includes processing circuitry 135 and machine readable media 140, along with a transceiver to communicate with the vehicle 120 using a wireless link 125. In an example, the machine readable media 140 contains a symmetric key that also is held by the vehicle 120 (e.g., in the machine readable media 115). In an example, the machine readable media 140 is secured, for example, via encryption, a trusted platform module, etc.

The processing circuitry 135 is arranged to perform one or more cryptographic functions. For example, the processing circuitry 135 can include an application specific integrated circuit (ASIC), field programmable gate array (FPGA), or execution units to compute a hash, message authentication code (MAC), or the like. In an example, the processing circuitry 135 includes hardware support for a monotonic counter that can be used to provide a level of variation (e.g., freshness) to generated MACs. As described below, this facility supports the device's ability to answer challenges posed by the controller 105 to actuate a motor.

The controller 105 includes processing circuitry 110 and the machine readable media 115. Similar to the machine readable media 140, the machine readable media 115 includes the symmetric key and can be cryptographically protected in a variety of ways.

The processing circuitry 110 is arranged to actuate a motor, in response to a request from the device 130, and upon a successful challenge-exchange with the device 130. As noted above, the challenge-exchange prevents attacks whereby an unauthorized device can instruct the controller 110 to actuate the motor. In the following examples, the motor that is actuated actuates a lock (e.g., moves a pin, release a magnet, etc.), such as a door lock, a trunk lock, etc. However, the motor actuator can be used to actuate other entities as well, such as starting the vehicle's engine, turning on or off a water pump at a building, etc.

The accomplish the challenge-exchange, the processing circuitry 110 is arranged to receive a request to actuate a lock from the device 130 (e.g., via the wireless link 125). In an example, a portion of the request is a vehicle identification number (VIN) identifier for the vehicle 120. The "VIN identifier," as used herein can be the VIN itself, a portion of the VIN, or an identifier derived from the VIN. Here, the VIN identifier enables the vehicle 120 to discriminate between a request directed at it, or a request that is directed to another vehicle. Other identifications can also be used, such as a serial number, registration tag, or any uniquely identifying code. Here, the vehicle contains the lock that is actuated by the motor and controlled by the controller 105. In an example, the request is to actuate the lock from a locked state to an unlocked state. In an example, the nature of the request (e.g., "unlock door," "open trunk," etc.) is carried in an open message (e.g., unencrypted portion) of the request. Thus, for example, the vehicle 120 can include multiple different locks or actuators specified by the request.

The processing circuitry 110 is arranged to calculate a challenge count. The challenge count is a variable number of challenge-exchanges that will be used for this request. Thus, the challenge count is calculated for each request from the device 130. In an example, the challenge count is above a threshold. Thus, in this example, there is a minimum for the challenge count. Establishing a minimum helps to establish a baseline security for the exchanges. In an example, the challenge count is below a second threshold (e.g., a maximum). Setting a maximum can be used to balance efficiency with security. In an example, the challenge count is a random number. Here, a random number generator of the controller 105, or accessible to the controller 105, can be used to create the challenge count. In an example, a pseudo-random generator or technique can be used to calculate the challenge count.

One way to generate a pseudo-random number involves leveraging the cryptographic hardware that is used by the controller 105 to generate a MAC. Thus, in an example, the challenge count can be calculated by selecting a portion of a MAC generated using: the key, a portion of the request (e.g., the VIN), and a monotonic counter. This monotonic counter is a secret, not shared outside of the controller 105, and used to seed the MAC, such that it is different each time that it is generated. Thus, in an example, the monotonic counter increments each time a request to actuate the lock is received.

In an example, the portion of the MAC used as the random number is selected by comparing bytes in the MAC to the threshold until a current byte being compared meets or exceeds the threshold. Thus, for example, byte 0 can be first compared to the minimum, and possibly maximum, thresholds. If byte 0 meets the thresholds, then the number represented by byte 0 is used as the pseudo-random number for the challenge count. If, however, byte 0 does not meet the thresholds, byte 1 is tested. The process continues until a suitable (e.g., meets the thresholds) byte is found in the MAC. Although a linear search is described here, any type of search through the bytes of the MAC can be used to find a suitable pseudo-random value to use as the challenge count.

The processing circuitry 110 is arranged to perform verification iterations until an end condition is met. A verification iteration is one part of the loop, which is repeated, until the number of verification iterations meets or exceeds the challenge count, or a failure condition is encountered. A freshness value is used to modify each iteration, changing with each iteration. In an example, the freshness value is implemented as a monotonic counter that is incremented with each iteration. In an example, this monotonic counter is a different counter than that described above with respect to pseudo-random number generation. In this case, the freshness value counter need not be kept secret, and its value can be shared as described below. Otherwise, the following occurs with each iteration.

The processing circuitry 110 is arranged to create a vehicle signature is created from the counter and a portion of the request (e.g., the VIN). In an example, the vehicle signature is a MAC generated using: the key, the portion of the request, and the freshness value. In an example, the portion of the request and a current value of the freshness value are concatenated (e.g., the value of the monotonic counter is added to the beginning, end, or somewhere in the middle of the portion of the request). However, any combination of the counter and the request portion can be used as long as both the controller 105 and the device 130 implement the same technique. Thus, the counter can be prepended to the portion of the request, the counter can be exclusively ORed (XORed) to the portion of the request, etc. Whatever technique that combines the variance of the counter to the portion of the request can be used.

The processing circuitry 110 is arranged to control the transmission of the vehicle signature is transmitted to the device 130. Thus, the processing circuitry 110 can direct a transceiver, or includes a transceiver, to use the wireless link 125 to transfer the vehicle signature to the device 130. In an example, in addition to the vehicle signature, a current value of the freshness value is sent to the device 130.

In response to receiving the vehicle signature, the processing circuitry 135 of the device 130 is arranged to verify the transmission by computing a MAC using the key stored in the machine readable media 140, a freshness value that the processing circuitry 135 maintains, and the message (e.g., portion of the original request). In an example, the device 130 uses the freshness value sent by the processing circuitry 110. In an example, the processing circuitry 135 verifies that the received freshness value is greater than a last freshness value. To accomplish this, the last freshness value used by the processing circuitry 135 is stored in the machine readable media 140. This last value is compared to the value sent by the processing circuitry 110, and if it is less than or equal to the last freshness value, the exchange is terminated. This prevents a malicious entity from recording a previous exchange and playing the exchange forward to achieve a set of valid future messages for the exchange.

Once this MAC is generated, it can be compared to that of the vehicle signature. If they match, then the transmission is good. The processing circuitry 135 is arranged to create a reply message (e.g., verification signature) by creating a MAC using the freshness value, the key, and the vehicle signature. This verification signature is then sent back to the vehicle 120 via the wireless link 125.

The processing circuitry 110 is arranged to compute a local-remote vehicle signature from the vehicle signature. In an example, the local-remote vehicle signature is a second MAC using the key and the vehicle signature. Thus, the first MAC is treated as the message and a second MAC is created by combining the key with that message.

The processing circuitry 110 is arranged to compare the local-remote vehicle signature is compared to the verification signature transmitted from the device 130. If the local-remote vehicle signature does not match the verification signature, then the failure end condition is met. The exchange terminates and the processing circuitry 110 does not actuate the motor. However, if the failure condition is not reached, then the processing circuitry 110 is arranged to end the verification iterations in response to the number of verification interactions meeting or exceeding the challenge count. In this case, the processing circuitry 110 is arranged to actuate the motor (e.g., actuate the lock).

Figure 2:
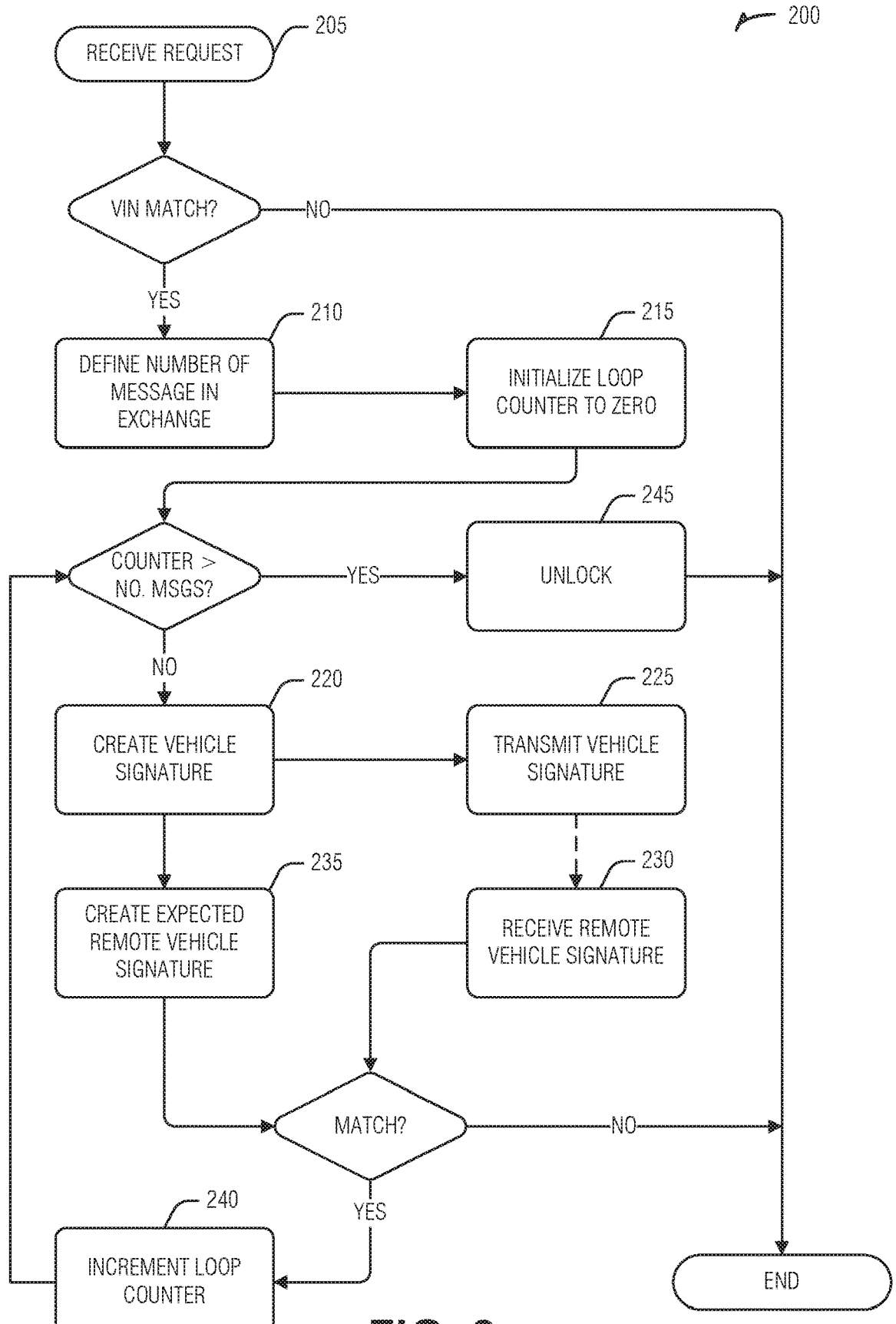
FIG. 2 illustrates a flow diagram of an example of a vehicle implemented lock-actuation exchange, according to an embodiment.

FIG. 2 illustrates a flow diagram of an example of a vehicle implemented lock-actuation exchange 200, according to an embodiment. The exchange 200 is illustrated from the vehicle's perspective, although a portion of the exchange is completed by a signaling device, such as a key fob, remote control, etc. The exchange 200 begins when the vehicle receives a request from the signaling device (operation 205). The request can include an identifier (e.g., a VIN) and a message indicating the purpose of the request, such as open a door, open a trunk, open the hood, start the engine, etc.

The vehicle determines whether the request is directed to the vehicle by comparing the VIN with its own VIN. If the VIN, or other identifier being used, does not match, the exchange ends; the request was not meant for the vehicle. If the VINs do match, then the vehicle prepares the challenge-exchange by defining (e.g., computing, calculating, etc.) the number of messages to use in the exchange 200 (operation 210). The vehicle initializes a loop counter (e.g., to zero) (operation 215).

The loop counter is compared against the number of messages defined for the exchange 200. As long as the loop counter is less than the defined number of messages, the loop continues. When the loop counter is equal to or greater than the defined number of messages, the loop exits, the vehicle performs the request (e.g., unlocks the door at operation 245), and then the exchange 200 ends.

While the loop continues, the vehicle creates a vehicle signature by combining (e.g., concatenating, interleaving, etc.) a freshness value (e.g., a monotonic counter that increments with each iteration of the loop) to the VIN to create a message, and then creating a MAC from the message and a secret key shared with the signaling device (operation 220). This vehicle signature is transmitted to the signaling device (225) along with the VIN and a current state of the freshness value. The signaling device then takes the message and computes its own version of the vehicle signature using the message, its own version of the private key, and the freshness value that is in sync with the vehicle counter (e.g., via a synchronization mechanism or received from the vehicle). If the signaling device's version of the vehicle signature matches that sent by the vehicle, then the signaling device creates a verification signature by creating another MAC using the secret key, the counter and the vehicle signature. For example, the signaling device can combine the freshness value to the received vehicle signature to create a new message, and then create the verification signature as a MAC with the key and the new message. The verification signature is then transmitted and received by the vehicle (operation 230). The signaling device can also verify that the freshness value provided by the vehicle is valid by tracking the last freshness value used by the signaling device and verifying that the current freshness value is at least larger than that last value.

In the meantime, or in response to the receipt of the verification signature, the vehicle computes an expected remote vehicle signature by following the same practice as the signaling device: creating a new message from the previously computed vehicle signature and the freshness value, and then creating a new MAC with the key and the new message (operation 235). This expected remote vehicle signature is compared to the received vehicle signature. If they do not match, then the exchange 200 terminates without actuating the lock (e.g., operation 245 does not occur). If the expected remote vehicle signature does match the received verification signature, then the loop counter is incremented (operation 240) and the exchange continues as described above.

Figure 3:
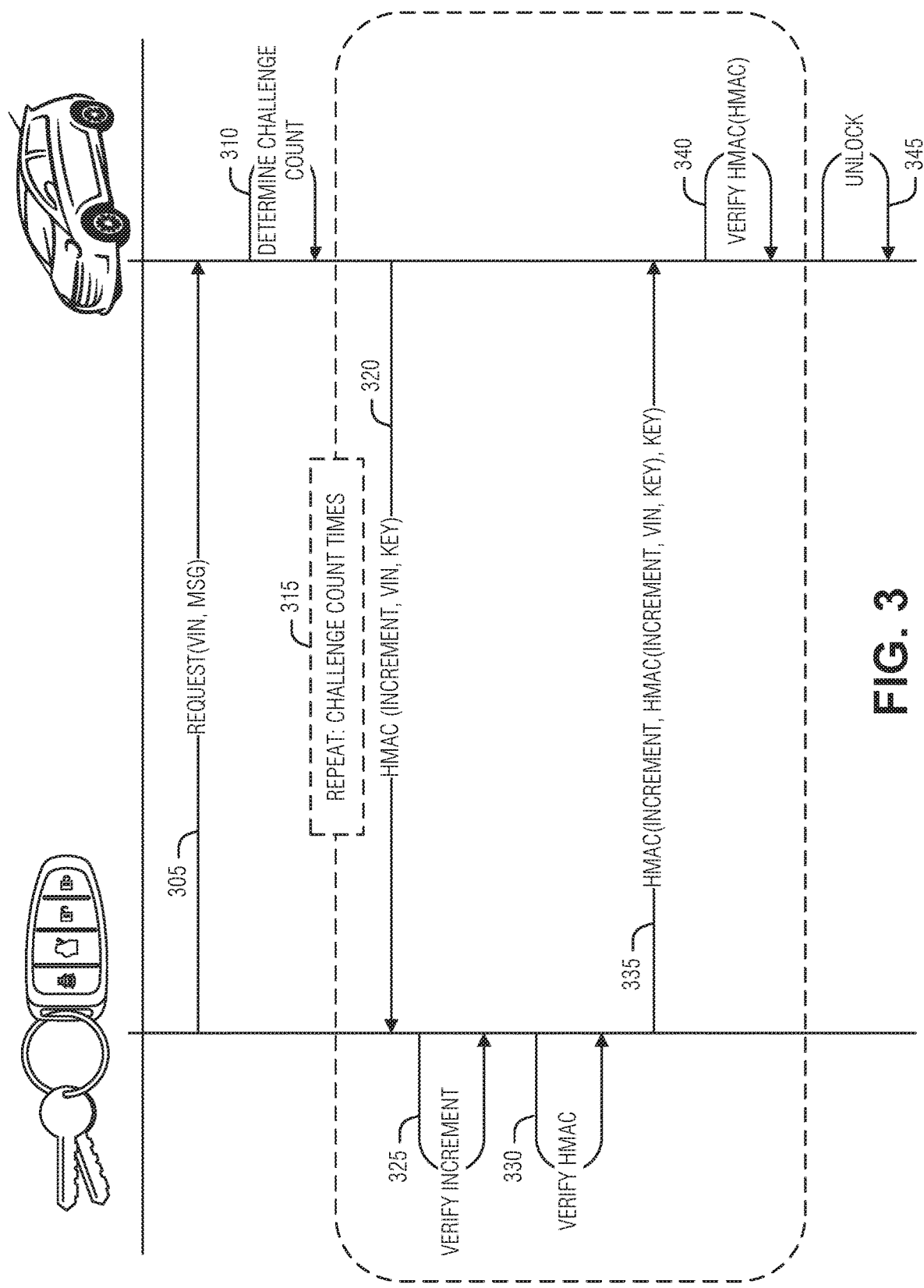
FIG. 3 illustrates a swim-lane diagram of an example message exchange between a key-fob and a vehicle performing a secure wireless lock-actuation exchange, according to an embodiment.

FIG. 3 illustrates a swim-lane diagram of an example message exchange between a key-fob and a vehicle performing a secure wireless lock-actuation exchange, according to an embodiment. The key-fob signals to the vehicle a request to unlock a door (message 305). The message 305 identifies the vehicle by a VIN, and includes a message indicating the purpose of the request.

Once the message 305 is received, the vehicle can determine how many challenges this exchange will use by defining a challenge count (operation 310). The challenge count can be determined by generating a random or pseudo-random value that is at least as large as a first threshold and optionally below a second threshold. Once the challenge count is determined, the vehicle initiates and controls the exit from an iterative message exchange (loop 315).

The loop 320 includes the generation and transmission of a hash-based MAC (HMAC) from the vehicle to the key-fob (message 320). The HMAC is created using an increment of a freshness value as determined by a monotonic counter on the vehicle, the VIN (or other agreed upon message), and a secret key). The VIN, or other agreed upon message, can also be included in the message 320, along with the current freshness value (e.g., as incremented for this portion of the loop 315).

The key-fob verifies the current freshness value by ensuring that it is greater than a last freshness value used by the key-fob (operation 325). If the transmitted freshness value is not greater than the last value used by the key-fob, then the key-fob terminates the loop 315. The key-fob can terminate the loop 315 by transmitting a termination message, transmitting a message than doesn't comply with the challenge exchanges, sending the message 305 again, or simply terminating communication. The key-fob verifies the HMAC (operation 330) and, assuming that the verification was successful, generates and transmits an HMAC of the HMAC in message 320) back to the vehicle (message 335). The freshness value is added to the HMAC of message 320, and the secret key is used to complete the HMAC of the message 335.

Once received, the vehicle verifies the HMAC of message 335. If the verification passes, the loop 315 continues until a number of exchanges defined by the challenge count is met. The loop 315 then exits and the vehicle unlocks the door (operation 345). If, however, the verification of operation 340 is unsuccessful, the vehicle does not unlock the door and terminates the exchange. At this point, the key-fob would initiate a new exchange via a new request.

Figure 4:
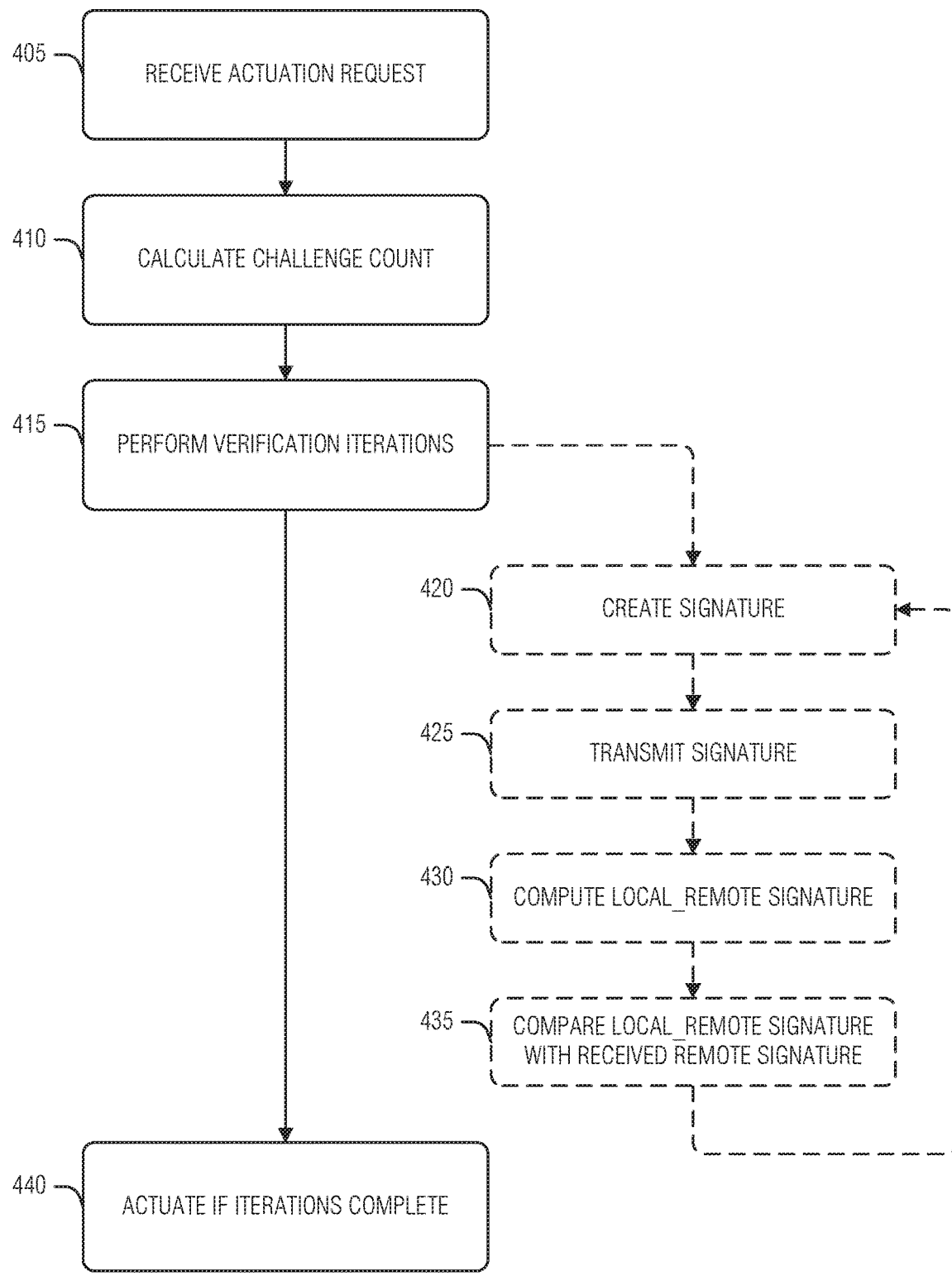
FIG. 4 illustrates a flow diagram of an example of a method for secure wireless lock-actuation exchange, according to an embodiment.

FIG. 4 illustrates a flow diagram of an example of a method 400 for secure wireless lock-actuation exchange, according to an embodiment. The operations of the method 400 are performed by hardware, such as that described above or below (e.g., processing circuitry).

At operation 405, a request to actuate a lock is received from a device. In an example, a portion of the request is a vehicle identification number (VIN) for a vehicle. Here, the vehicle contains the lock. In an example, the request is to actuate the lock from a locked state to an unlocked state.

At operation 410, a challenge count is calculated. In an example, the challenge count is above a threshold. In an example, the challenge count is below a second threshold. In an example, the challenge count is a random number.

In an example, calculating the challenge count includes selecting a portion of a message authentication code (MAC) generated using: a key, the portion of the request, and a monotonic counter. In an example, selecting the portion of the MAC includes comparing bytes in the MAC to the threshold until a current byte being compared meets or exceeds the threshold. In an example, the monotonic counter increments each time a request to actuate the lock is received.

At operation 415, verification iterations are performed until an end condition is met. A verification iteration (e.g., each iteration) includes operations 420 through 435, and the iterations are repeated until the end condition is met.

At operation 420, a vehicle signature is created from a freshness value and a portion of the request (e.g., the VIN). In an example, the freshness value is generated from a monotonic counter. In an example, the monotonic counter is incremented at each iteration of the verification interactions.

In an example, the vehicle signature is a message authentication code (MAC) generated using: a key, the portion of the request, and the freshness value. In an example, the portion of the request and a current state of the freshness value are concatenated (e.g., the value of the monotonic counter is added to the beginning, end, or somewhere in the middle of the portion of the request).

In an example, the key is a symmetric key present on the device and on hardware performing the verification iterations. In an example, the hardware performing the verification iterations includes a secure storage in which the key is held.

At operation 425, the vehicle signature is transmitted to the device. In an example, the freshness value is included in the transmission to the device. In an example, the device verifies that the transmitted freshness value is greater than any previous freshness value received by the device.

At operation 430, a local-remote vehicle signature is computed from the vehicle signature. In an example, computing the local-remote vehicle signature includes computing a second MAC using the key and the vehicle signature.

At operation 435, the local-remote vehicle signature is compared to a verification signature transmitted from the device. The device derived the verification signature from the previously transmitted vehicle signature.

The end condition for the verification iterations is at least one of the verification iterations reaching the challenge count or the comparing (operation 435) determining that the local-remote vehicle signature does not match the verification signature. The first end condition is reached in response to each challenge being correctly met by the device. The second end condition means that a challenge by the device was not met, and the process terminates in failure.

At operation 440, the lock is actuated in response to the counter being equal to or greater than the challenge count.

Figure 5:
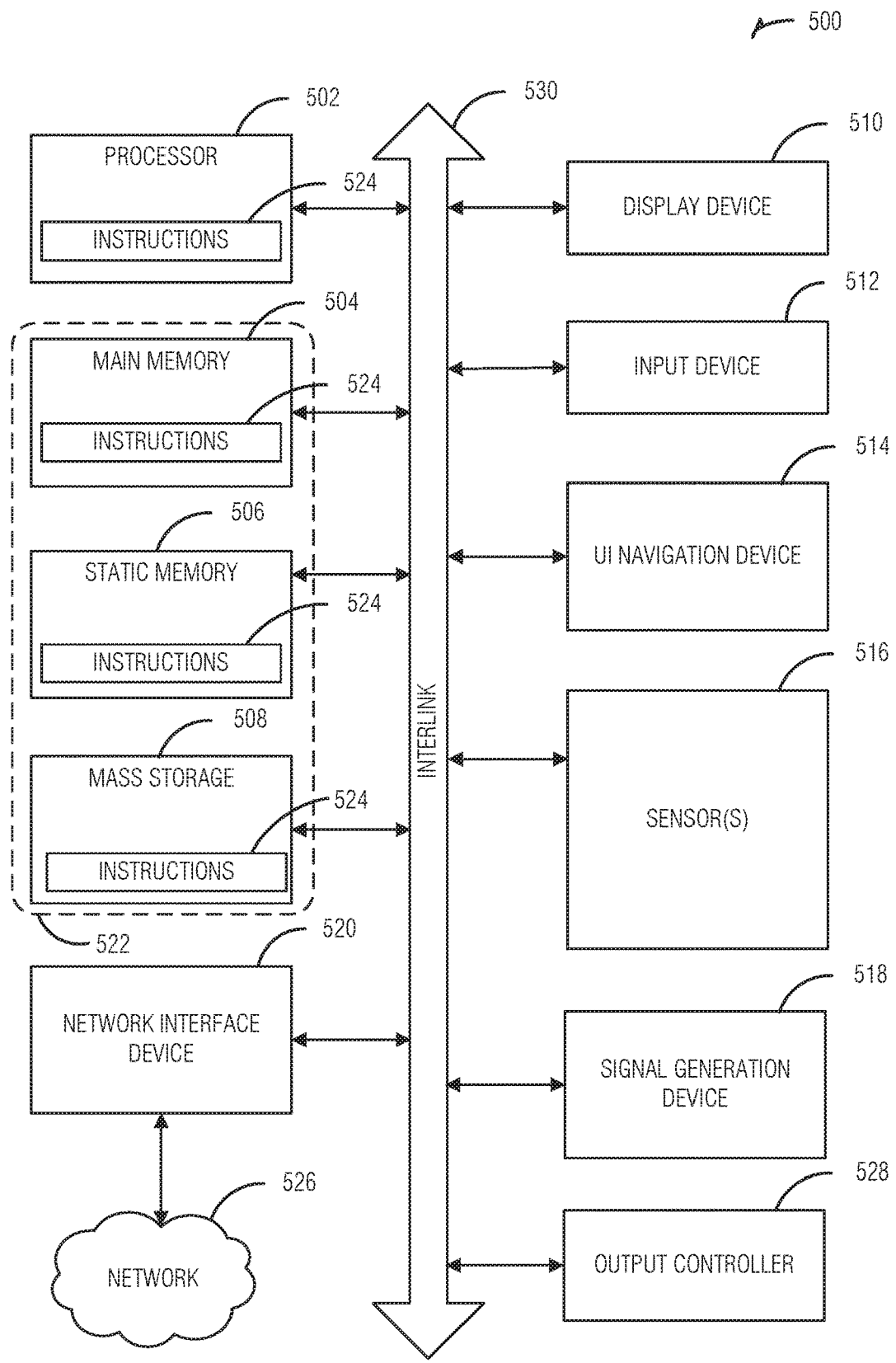
FIG. 5 is a block diagram illustrating an example of a machine upon which one or more embodiments can be implemented.

FIG. 5 illustrates a block diagram of an example machine 500 upon which any one or more of the techniques (e.g., methodologies) discussed herein can perform. Examples, as described herein, can include, or can operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 can operate as a standalone device or can be connected (e.g., networked) to other machines. In a networked deployment, the machine 500 can operate in the capacity of a server machine, a client machine, or both in server-client network environments. In an example, the machine 500 can act as a peer machine in peer-to-peer (P2P) (or other distributed) network environment. The machine 500 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 can include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drive, tape drive, flash storage, or other block devices) some or all of which can communicate with each other via an interlink (e.g., bus) 530. The machine 500 can further include a display unit 510, an alphanumeric input device 512 (e.g., a keyboard), and a user interface (UI) navigation device 514 (e.g., a mouse). In an example, the display unit 510, input device 512 and UI navigation device 514 can be a touch screen display. The machine 500 can additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 can include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 508 can be, or include, a machine readable medium 522 on which is stored one or more sets of data structures or instructions 524 (e.g., software) embodying or utilized by any one or more of the techniques or functions described herein. The instructions 524 can also reside, completely or at least partially, within any of registers of the processor 502, the main memory 504, the static memory 506, or the mass storage 508 during execution thereof by the machine 500. In an example, one or any combination of the hardware processor 502, the main memory 504, the static memory 506, or the mass storage 508 can constitute the machine readable media 522. While the machine readable medium 522 is illustrated as a single medium, the term "machine readable medium" can include a single medium or multiple media (e.g., a centralized or distributed database, and/or associated caches and servers) configured to store the one or more instructions 524.

The term "machine readable medium" can include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 can be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 can include one or more physical jacks (e.g., Ethernet, coaxial, or phone jacks) or one or more antennas to connect to the communications network 526. In an example, the network interface device 520 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that can store, encoding or carrying instructions for execution by the machine 500, and includes digital or analog communications signals or other intangible medium to facilitate communication of such software. A transmission medium is a machine readable medium.

Additional Notes & Examples

Example 1 is a controller for secure wireless lock-actuation exchange, the controller comprising: a lock actuator to lock or release; and processing circuitry to: receive a request to actuate a lock from a device; calculate a challenge count; perform verification iterations until an end condition is met, for each verification iteration, the processing circuitry: creates a vehicle signature from the freshness value and a portion of the request; transmits the vehicle signature to the device; computes a local-remote vehicle signature from the vehicle signature; and compares the local-remote vehicle signature to a verification signature transmitted from the device, the verification signature derived from the vehicle signature, wherein the end condition is at least one of the verification iterations reaching the challenge count or the comparing determining that the local-remote vehicle signature does not match the verification signature; and activate the lock actuator in response to the counter being equal to or greater than the challenge count.

In Example 2, the subject matter of Example 1, wherein the freshness value is generated by a monotonic counter.

In Example 3, the subject matter of Example 2, wherein the verification iteration includes incrementing the monotonic counter.

In Example 4, the subject matter of any of Examples 1-3, wherein the challenge count is above a threshold.

In Example 5, the subject matter of Example 4, wherein the challenge count is below a second threshold.

In Example 6, the subject matter of any of Examples 4-5, wherein the challenge count is a random number.

In Example 7, the subject matter of Example 6, wherein, to calculate the challenge count, the processing circuitry selects a portion of a message authentication code (MAC) generated using a key, the portion of the request, and a second freshness value.

In Example 8, the subject matter of Example 7, wherein, to select the portion of the MAC, the processing circuitry compares bytes in the MAC to the threshold until a current byte being compared meets or exceeds the threshold.

In Example 9, the subject matter of any of Examples 7-8, wherein the second freshness value is generated by a monotonic counter that increments each time a request to actuate the lock is received.

In Example 10, the subject matter of any of Examples 1-9, wherein the vehicle signature is a message authentication code (MAC) generated using a key, the portion of the request, and the freshness value that changes upon each verification iteration.

In Example 11, the subject matter of Example 10, wherein the portion of the request and a current value of the freshness value are concatenated.

In Example 12, the subject matter of any of Examples 10-11, wherein, to compute the local-remote vehicle signature, the processing circuitry computes a second MAC using the key and the vehicle signature.

In Example 13, the subject matter of any of Examples 10-12, wherein the key is a symmetric key present on the device and on hardware performing the verification iterations.

In Example 14, the subject matter of Example 13, wherein the hardware performing the verification iterations includes a secure storage in which the key is held.

In Example 15, the subject matter of any of Examples 10-14, wherein the MAC is produced using a SHA256 hash function.

In Example 16, the subject matter of any of Examples 1-15, wherein the portion of the request is a vehicle identification number (VIN) for a vehicle, the vehicle containing the lock.

In Example 17, the subject matter of any of Examples 1-16, wherein the request is to actuate the lock from a locked state to an unlocked state.

Example 18 is a method for secure wireless lock-actuation exchange, the method comprising: receiving a request to actuate a lock from a device; calculating a challenge count; performing verification iterations until an end condition is met, a verification iteration comprising: creating a vehicle signature from a freshness value and a portion of the request; transmitting the vehicle signature to the device; computing a local-remote vehicle signature from the vehicle signature; and comparing the local-remote vehicle signature to a verification signature transmitted from the device, the verification signature derived from the vehicle signature, wherein the end condition is at least one of the verification iterations reaching the challenge count or the comparing determining that the local-remote vehicle signature does not match the verification signature; and actuating the lock in response to the counter being equal to or greater than the challenge count.

In Example 19, the subject matter of Example 18, wherein the freshness value is generated by a monotonic counter.

In Example 20, the subject matter of Example 19, wherein the verification iteration includes incrementing the monotonic counter.

In Example 21, the subject matter of any of Examples 18-20, wherein the challenge count is above a threshold.

In Example 22, the subject matter of Example 21, wherein the challenge count is below a second threshold.

In Example 23, the subject matter of any of Examples 21-22, wherein the challenge count is a random number.

In Example 24, the subject matter of Example 23, wherein calculating the challenge count includes selecting a portion of a message authentication code (MAC) generated using a key, the portion of the request, and a second freshness value.

In Example 25, the subject matter of Example 24, wherein selecting the portion of the MAC includes comparing bytes in the MAC to the threshold until a current byte being compared meets or exceeds the threshold.

In Example 26, the subject matter of any of Examples 24-25, wherein the second freshness value is generated by a monotonic counter that increments each time a request to actuate the lock is received.

In Example 27, the subject matter of any of Examples 18-26, wherein the vehicle signature is a message authentication code (MAC) generated using a key, the portion of the request, and the freshness value that changes upon each verification iteration.

In Example 28, the subject matter of Example 27, wherein the portion of the request and a current value of the freshness value are concatenated.

In Example 29, the subject matter of any of Examples 27-28, wherein computing the local-remote vehicle signature includes computing a second MAC using the key and the vehicle signature.

In Example 30, the subject matter of any of Examples 27-29, wherein the key is a symmetric key present on the device and on hardware performing the verification iterations.

In Example 31, the subject matter of Example 30, wherein the hardware performing the verification iterations includes a secure storage in which the key is held.

In Example 32, the subject matter of any of Examples 27-31, wherein the MAC is produced using a SHA256 hash function.

In Example 33, the subject matter of any of Examples 18-32, wherein the portion of the request is a vehicle identification number (VIN) for a vehicle, the vehicle containing the lock.

In Example 34, the subject matter of any of Examples 18-33, wherein the request is to actuate the lock from a locked state to an unlocked state.

Example 35 is a machine readable medium including instructions for secure wireless lock-actuation exchange, the instructions, when executed by a machine, cause the machine to perform operations comprising: receiving a request to actuate a lock from a device; calculating a challenge count; performing verification iterations until an end condition is met, a verification iteration comprising: creating a vehicle signature from a freshness value and a portion of the request; transmitting the vehicle signature to the device; computing a local-remote vehicle signature from the vehicle signature; and comparing the local-remote vehicle signature to a verification signature transmitted from the device, the verification signature derived from the vehicle signature, wherein the end condition is at least one of the verification iterations reaching the challenge count or the comparing determining that the local-remote vehicle signature does not match the verification signature; and actuating the lock in response to the counter being equal to or greater than the challenge count.

In Example 36, the subject matter of Example 35, wherein the freshness value is generated by a monotonic counter.

In Example 37, the subject matter of Example 36, wherein the verification iteration includes incrementing the monotonic counter.

In Example 38, the subject matter of any of Examples 35-37, wherein the challenge count is above a threshold.

In Example 39, the subject matter of Example 38, wherein the challenge count is below a second threshold.

In Example 40, the subject matter of any of Examples 38-39, wherein the challenge count is a random number.

In Example 41, the subject matter of Example 40, wherein calculating the challenge count includes selecting a portion of a message authentication code (MAC) generated using a key, the portion of the request, and a second freshness value.

In Example 42, the subject matter of Example 41, wherein selecting the portion of the MAC includes comparing bytes in the MAC to the threshold until a current byte being compared meets or exceeds the threshold.

In Example 43, the subject matter of any of Examples 41-42, wherein the second freshness value is generated by a monotonic counter that increments each time a request to actuate the lock is received.

In Example 44, the subject matter of any of Examples 35-43, wherein the vehicle signature is a message authentication code (MAC) generated using a key, the portion of the request, and the freshness value that changes upon each verification iteration.

In Example 45, the subject matter of Example 44, wherein the portion of the request and a current value of the freshness value are concatenated.

In Example 46, the subject matter of any of Examples 44-45, wherein computing the local-remote vehicle signature includes computing a second MAC using the key and the vehicle signature.

In Example 47, the subject matter of any of Examples 44-46, wherein the key is a symmetric key present on the device and on hardware performing the verification iterations.

In Example 48, the subject matter of Example 47, wherein the hardware performing the verification iterations includes a secure storage in which the key is held.

In Example 49, the subject matter of any of Examples 44-48, wherein the MAC is produced using a SHA256 hash function.

In Example 50, the subject matter of any of Examples 35-49, wherein the portion of the request is a vehicle identification number (VIN) for a vehicle, the vehicle containing the lock.

In Example 51, the subject matter of any of Examples 35-50, wherein the request is to actuate the lock from a locked state to an unlocked state.

Example 52 is a system for secure wireless lock-actuation exchange, the system comprising: means for receiving a request to actuate a lock from a device; means for calculating a challenge count; means for performing verification iterations until an end condition is met, a verification iteration comprising: creating a vehicle signature from a freshness value and a portion of the request; transmitting the vehicle signature to the device; computing a local-remote vehicle signature from the vehicle signature; and comparing the local-remote vehicle signature to a verification signature transmitted from the device, the verification signature derived from the vehicle signature, wherein the end condition is at least one of the verification iterations reaching the challenge count or the comparing determining that the local-remote vehicle signature does not match the verification signature; and actuating the lock in response to the counter being equal to or greater than the challenge count.

In Example 53, the subject matter of Example 52, wherein the freshness value is generated by a monotonic counter.

In Example 54, the subject matter of Example 53, wherein the verification iteration includes incrementing the monotonic counter.

In Example 55, the subject matter of any of Examples 52-54, wherein the challenge count is above a threshold.

In Example 56, the subject matter of Example 55, wherein the challenge count is below a second threshold.

In Example 57, the subject matter of any of Examples 55-56, wherein the challenge count is a random number.

In Example 58, the subject matter of Example 57, wherein the means for calculating the challenge count include means for selecting a portion of a message authentication code (MAC) generated using a key, the portion of the request, and a second freshness value.

In Example 59, the subject matter of Example 58, wherein the means for selecting the portion of the MAC include means for comparing bytes in the MAC to the threshold until a current byte being compared meets or exceeds the threshold.

In Example 60, the subject matter of any of Examples 58-59, wherein the second freshness value is generated by a monotonic counter that increments each time a request to actuate the lock is received.

In Example 61, the subject matter of any of Examples 52-60, wherein the vehicle signature is a message authentication code (MAC) generated using a key, the portion of the request, and the freshness value that changes upon each verification iteration.

In Example 62, the subject matter of Example 61, wherein the portion of the request and a current value of the freshness value are concatenated.

In Example 63, the subject matter of any of Examples 61-62, wherein the means for computing the local-remote vehicle signature include means for computing a second MAC using the key and the vehicle signature.

In Example 64, the subject matter of any of Examples 61-63, wherein the key is a symmetric key present on the device and on hardware performing the verification iterations.

In Example 65, the subject matter of Example 64, wherein the hardware performing the verification iterations includes a secure storage in which the key is held.

In Example 66, the subject matter of any of Examples 61-65, wherein the MAC is produced using a SHA256 hash function.

In Example 67, the subject matter of any of Examples 52-66, wherein the portion of the request is a vehicle identification number (VIN) for a vehicle, the vehicle containing the lock.

In Example 68, the subject matter of any of Examples 52-67, wherein the request is to actuate the lock from a locked state to an unlocked state.

Example 69 is at least one machine-readable medium including instructions that, when executed by processing circuitry, cause the processing circuitry to perform operations to implement of any of Examples 1-68.

Example 70 is an apparatus comprising means to implement of any of Examples 1-68.

Example 71 is a system to implement of any of Examples 1-68.

Example 72 is a method to implement of any of Examples 1-68.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A controller for secure wireless lock-actuation exchange, the controller comprising:
   a lock actuator to switch a state of a lock between a first state and a second state, wherein the first state is locked and the second state is unlocked; and
   processing circuitry to:
      receive a request to actuate a lock from a device;
      calculate a challenge count for the request;
      perform verification iterations until an end condition is met, for each verification iteration, the processing circuitry:
         creates a vehicle signature from a freshness value and a portion of the request;
         transmits the vehicle signature to the device;
         computes a local-remote vehicle signature from the vehicle signature; and
         compares the local-remote vehicle signature to a verification signature transmitted from the device, the verification signature derived from the vehicle signature, wherein the end condition is at least one of a number of verification iterations reaching the challenge count or the comparing determining that the local-remote vehicle signature does not match the verification signature; and
      activate the lock actuator, to switch the state of the lock, in response to the number of verification iterations being equal to or greater than the challenge count.

2. The controller of claim 1, wherein the freshness value is generated by a monotonic counter.

3. The controller of claim 1, wherein the challenge count is above a threshold.

4. The controller of claim 3, wherein the challenge count is a random number.

5. The controller of claim 4, wherein, to calculate the challenge count, the processing circuitry selects a portion of a message authentication code (MAC) generated using a key, the portion of the request, and a second freshness value.

6. The controller of claim 1, wherein the vehicle signature is a message authentication code (MAC) generated using a key, the portion of the request, and the freshness value that changes upon each verification iteration.

7. The controller of claim 6, wherein, to compute the local-remote vehicle signature, the processing circuitry computes a second MAC using the key and the vehicle signature.

8. A method for secure wireless lock-actuation exchange, the method comprising:
   receiving a request to actuate a lock from a device;
   calculating a challenge count for the request;
   performing verification iterations until an end condition is met, a verification iteration comprising:
      creating a vehicle signature from a freshness value and a portion of the request;
      transmitting the vehicle signature to the device;
      computing a local-remote vehicle signature from the vehicle signature; and
      comparing the local-remote vehicle signature to a verification signature transmitted from the device, the verification signature derived from the vehicle signature, wherein the end condition is at least one of a number of verification iterations reaching the challenge count or the comparing determining that the local-remote vehicle signature does not match the verification signature; and
   actuating the lock, to switch a state of the lock, in response to the number of verification iterations being equal to or greater than the challenge count, wherein the state of the lock is either a first state or a second state, and wherein the first state is locked and the second state is unlocked.

9. The method of claim 8, wherein the freshness value is generated by a monotonic counter.

10. The method of claim 8, wherein the challenge count is above a threshold.

11. The method of claim 10, wherein the challenge count is a random number.

12. The method of claim 11, wherein calculating the challenge count includes selecting a portion of a message authentication code (MAC) generated using a key, the portion of the request, and a second freshness value.

13. The method of claim 8, wherein the vehicle signature is a message authentication code (MAC) generated using a key, the portion of the request, and the freshness value that changes upon each verification iteration.

14. The method of claim 13, wherein computing the local-remote vehicle signature includes computing a second MAC using the key and the vehicle signature.

15. A non-transitory machine readable medium including instructions for secure wireless lock-actuation exchange, the instructions, when executed by a machine, cause the machine to perform operations comprising:

receiving a request to actuate a lock from a device;
calculating a challenge count for the request;
performing verification iterations until an end condition is met, a verification iteration comprising:
    creating a vehicle signature from a freshness value and a portion of the request;
    transmitting the vehicle signature to the device;
    computing a local-remote vehicle signature from the vehicle signature; and
    comparing the local-remote vehicle signature to a verification signature transmitted from the device, the verification signature derived from the vehicle signature, wherein the end condition is at least one of a number of verification iterations reaching the challenge count or the comparing determining that the local-remote vehicle signature does not match the verification signature; and
actuating the lock, to switch a state of the lock, in response to the number of verification iterations being equal to or greater than the challenge count, wherein the state of the lock is either a first state or a second state, and wherein the first state is locked and the second state is unlocked.

16. The non-transitory machine readable medium of claim 15, wherein the freshness value is generated by a monotonic counter.

17. The non-transitory machine readable medium of claim 15, wherein the challenge count is above a threshold.

18. The non-transitory machine readable medium of claim 17, wherein the challenge count is a random number.

19. The non-transitory machine readable medium of claim 18, wherein calculating the challenge count includes selecting a portion of a message authentication code (MAC) generated using a key, the portion of the request, and a second freshness value.

20. The non-transitory machine readable medium of claim 15, wherein the vehicle signature is a message authentication code (MAC) generated using a key, the portion of the request, and the freshness value that changes upon each verification iteration.

21. The non-transitory machine readable medium of claim 20, wherein computing the local-remote vehicle signature includes computing a second MAC using the key and the vehicle signature.

\* \* \* \* \*